US009389416B1

(12) United States Patent
Rose et al.

(10) Patent No.: US 9,389,416 B1
(45) Date of Patent: Jul. 12, 2016

(54) OPTICAL RESONANCE SCANNER (71) Applicant: FEMOTECH GmbH, Mittenaar-Offenbach (DE)

(72) Inventors: Andreas Rose, Herborn (DE); Guenter Herr, Ehringshausen (DE); Michael Weil, Mittenaar (DE)

(73) Assignee: FEMOTECH GmbH, Mittenaar-Offenbach (DE)

( * ) Notice: Subject to any disclaimer, the term of this patent is extended or adjusted under 35 U.S.C. 154(b) by 0 days.

(21) Appl. No.: 14/910,392

(22) PCT Filed: Aug. 8, 2014

(86) PCT No.: PCT/EP2014/067059
§ 371 (c)(1),
(2) Date: Feb. 5, 2016

(87) PCT Pub. No.: WO2015/018924
PCT Pub. Date: Feb. 12, 2015

(30) Foreign Application Priority Data

Aug. 8, 2013 (DE) ............... 20 2013 103 566 U (51) Int. Cl.
*G02B 26/08* (2006.01)
*G02B 26/10* (2006.01)
(52) U.S. Cl.
CPC ............. *G02B 26/10* (2013.01); *G02B 26/085* (2013.01)
(58) Field of Classification Search
CPC ..... G02B 26/085; H02K 21/02; H02K 21/38; H02K 21/12; H02K 21/46
USPC .......... 359/198.1, 199.3, 200.7, 224.1–224.2; 310/36, 40 MM, 40 R, 46, 48, 66, 272
See application file for complete search history.

(56) References Cited

U.S. PATENT DOCUMENTS

| 4,502,752 A | 3/1985 | Montagu |
| 4,874,215 A | 10/1989 | Montagu |

(Continued)

FOREIGN PATENT DOCUMENTS

WO 2006/004644 A1 1/2006

OTHER PUBLICATIONS

International Search Report issued Feb. 27, 2015 in Int'l Application No. PCT/EP2014/067059.

(Continued)

*Primary Examiner* — James Phan
(74) *Attorney, Agent, or Firm* — Panitch Schwarze Belisario & Nadel LLP (57) ABSTRACT An optical resonance scanner has a spring-elastic bending element (10) excitable to effect rotational oscillations about a longitudinal axis (A-A) using a stationary magnet (9) and a stationary drive coil (5) that is wound around a pole shoe (20). The pole shoe (20) is magnetically coupled to the magnet (9) and has two mutually opposite free ends (21, 22) between which the bending element (10) is arranged symmetrically so that a magnetic flux can be transferred substantially perpendicularly to the longitudinal axis (A-A). In superimposition of the magnet- and coil-induced magnetic fluxes the magnet (9) and a first half (23) of the pole shoe (20) form a first magnetic circuit (30), and the magnet (9) and a second half (24) of the pole shoe (20) form a second magnetic circuit (31), which run in opposite senses with respect to one another in a plane perpendicularly to the longitudinal axis (A-A) through a magnetizable section (6) of the bending element (10).

15 Claims, 8 Drawing Sheets

(56) References Cited

U.S. PATENT DOCUMENTS

| | | | |
|---|---|---|---|
| 2004/0100155 A1* | 5/2004 | Sesselmann | F16H 49/001 310/75 R |
| 2005/0036187 A1 | 2/2005 | Sugawara | |
| 2006/0017333 A1* | 1/2006 | Loebel | G02B 7/1821 310/36 |
| 2013/0020981 A1 | 1/2013 | Borchers et al. | |

OTHER PUBLICATIONS

Int'l Preliminary Examination Report on Patentability Issued Feb. 9, 2016 in Int'l Application No. PCT/EP2014/067059.

* cited by examiner

Fig. 8 ature, such as for example U.S. Pat. No. 5,557,444 A or DE 695 29 530 T2, or US 2006/0017333 A1, have various disadvantages. Through the movement of the anchor that is described therein, horizontally transverse forces and in addition variations in the vertical attraction force are created between anchor and magnet due to the differences in reluctance of the two working air gaps. The transverse forces vary periodically with the oscillation frequency and reach the maximum at full deflection. The vertical forces vary periodically with double oscillation frequency between the attraction force value $F_{ho}$ (currentless and non-deflected) and the highest value in the end positions. In this manner, horizontal and vertical oscillations are excited, which lead to a wobbling motion of the anchor and thus of the mirror, which in turn results in imaging errors. In addition, the operating point of the magnet is periodically shifted with double oscillation frequency. Due to the relatively high specific Ohmic resistance of the material the permanent magnet is made of there is almost no damping effect through eddy currents.

OPTICAL RESONANCE SCANNER

CROSS-REFERENCE TO RELATED APPLICATIONS

This application is a national stage application (under 35 USC §371) of PCT/EP20141067059, filed Aug. 8, 2014, which claims benefit of German application No. 20 2013 103 566.1, filed Aug. 8, 2013, the contents of each of which are incorporated by reference herein.

BACKGROUND OF THE INVENTION

Technical Field and State of the Art

The invention relates to an optical scanning device, more particularly to an optical resonance scanner, more particularly a torsional resonance oscillator, comprising a spring-elastic bending element, which can be excited to effect oscillations, more particularly to effect rotational oscillations, more particularly sinusoid rotational oscillations, about a longitudinal axis by means of at least one stationary magnet and by means of at least one stationary drive coil, more particularly up to a defined tilt angle, wherein the drive coil is wound around a pole shoe, which is magnetically coupled to a magnet and has two mutually opposite free ends, between which the bending element is arranged symmetrically in such a way that between the bending element and the free ends of the pole shoe a magnetic flux can be transferred substantially perpendicularly to the longitudinal axis.

There are numerous application possibilities for such optical scanning devices, for example in material processing systems, projection systems, printing machines, optical target acquisitions and range finders, for illumination, raster image acquisition, data acquisition or in barcode readers, as well as in other industrial, medical, military or consumer applications.

For the most part, conventional optical resonance scanners with a magnetic driver either comprise moving magnets or moving plungers as components of an electromagnetic driver for the purpose of generating and maintaining an oscillating bending element. Here, the disadvantage arises that the bending element has a high inertia torque, as at least some of the electromagnetic driver parts are mechanically connected to the bending element. As a result, such scanners usually cannot be driven at frequencies of over 16 KHz, in particular if high mirror diameters, large scan angles and/or mirrors with a large material thickness are used.

In contrast to that, the present invention relates to such optical scanners, in which neither moving magnets nor plungers, but only stationary coils and magnets are used for generating and maintaining the oscillation movement.

An optical scanning device of the aforementioned kind, comprising stationary coils and stationary magnets, is known from U.S. Pat. No. 5,557,444 A or DE 695 29 530 T2, for example. What is described therein is an optical resonance scanner which, for the purpose of driving a mirror in an oscillatory manner, comprises two permanent magnets that are in direct contact with a spring-elastic bending element which is made of a ferromagnetic material and onto which the mirror that is to be set into rotary oscillation is mounted. Here, the permanent-magnetically generated flux of the two magnets is supplied to the anchor and the working air gaps along the longitudinal direction of the bending element (through the torsion rod). Due to the large disparity in surface size between the torsion cross-section and the working air gap surface only low magnetic preloads can be achieved.

The systems with the functionality described above as they are described and embodied in the technical and patent litera- Further, in scanners known from the state of the art, independently of whether they have or do not have any moving electromagnetic driver parts, problems occur with respect to the oscillation amplitude. Thus, the deflection of the bending material is subject to a thermal gradient at non-constant temperature conditions in the environment, so that a constant deflection or a constant oscillation amplitude cannot be ensured across a wide temperature range. The same applies to changing currents of driver electronics, which also lead to a non-constant deflection or oscillation amplitude.

Thus, it is the objective of the present invention to further develop an optical scanning device of the kind as it has been mentioned in the beginning in such a manner that the efficiency of the driver is enhanced without excess heat generation, and that at the same time an operation with mirrors having a large cross-section and large thickness is possible across large scan angles also at frequencies above 16 kHz. In addition, preferably an operation with constant oscillation amplitudes is to be facilitated.

SUMMARY OF THE INVENTION

According to a first embodiment of the invention, the scanning device is characterized in that the magnet is arranged symmetrically with respect to the free ends of the pole shoe in such a way that the magnetic flux generated by the magnet is coupled to the bending element substantially perpendicularly to the longitudinal axis, and that, as the magnet-induced and coil-induced magnetic fluxes are superimposed, a first magnetic circuit is formed through the magnet and a first half of the pole shoe, and a second magnetic circuit is formed through the magnet and a second half of the pole shoe, which extend in opposite senses with respect to one another through a magnetizable section of the bending element in a plane perpendicular to the longitudinal axis.

A corresponding arrangement of the scanning device is also referred to as a torsional resonance oscillator.

It has been recognized according to this embodiment of the invention that the scanning devices known from U.S. Pat. No. 5,557,444 A or DE 695 29 530 T2 result in very long magnetic flux paths due to the special arrangement of the electromagnetic driver parts, more particularly due to the arrangement of the two permanent magnets at the ends of the bending element, which sometimes causes considerable eddy currents and in addition results in losses with respect to the efficiency of the driver due to the accompanying temperature increase in the ferromagnetic material.

Through the arrangement of the pole shoe and of the magnet according to this embodiment of the invention, namely relative to the bending element, more particularly through the coplanar arrangement of the first and second magnetic circuit, the magnetic flux paths and thus the occurrence of eddy currents is considerably minimized.

According to this embodiment of the invention, the first and the second magnetic circuit have a common magnetic path through the magnet and partially through the bending element, i.e., through the magnetizable section of the bending element. Inside the latter, the two circuits are divided, extending in opposite senses with respect to one another via separate paths through the first or the second half of the pole shoe, and are then reunited inside the magnet. At that, the course of the magnetic fluxes depends on the polarity of the fields that are generated by the at least one drive coil and the magnet.

However, according to another advantageous embodiment of the invention, a second drive coil is provided in addition to the first drive coil, wherein the first drive coil is wound around the first half of the pole shoe and the second drive coil is wound around the second half of the pole shoe. In some embodiments, the two drive coils can be regarded as coil sections of a common coil.

The magnetic circuits that result solely from the magnetic flux of the magnet are formed symmetrically due to the symmetrical arrangement of the magnet relative to the two halves of the pole shoe and the bending element, but they become asymmetrical if an electrical alternating current driver signal, e.g. a sinusoidal signal or a square wave signal, is applied to the first and/or the second drive coil. In this way, additional coil-induced magnetic fluxes are generated in one or both magnetic circuits, which amplify the total magnetic flux in the one circuit and reduce it in the other circuit in a periodically alternating manner. The asymmetry of the magnetic forces between the traversed magnetizable section of the bending element and the free ends of the pole shoe which is resulting therefrom causes a periodically changing torsional moment on the bending element, as a result of which the bending element is excited to effect oscillations, more particularly rotary oscillations around its longitudinal axis. At that, the oscillation frequency of the bending element is directly proportional to the frequency of the driver signal.

In order to create an asymmetry with two coils, the first and the second drive coil are either wound in opposite directions or are driven by phase-shifted driver signals, more particularly driver signals that are opposite in phase. According to a preferred embodiment of the invention, the first and the second drive coil are wound in opposite directions and with the same number of windings. This is the simplest manner to effect asymmetry. Further it is advantageous to reduce the number of windings for operation at higher driver signal frequencies, since the electrical impedance of the coils generally increases disadvantageously as the frequency becomes higher.

Further, it is achieved through the scanning device according to the invention that in contrast to the scanning devices known from U.S. Pat. No. 5,557,444 A or DE 695 29 530 T2 the bending element is penetrated by magnetic flux lines obliquely to its longitudinal axis and thus only in a locally limited common section. In this manner, eddy currents are considerably minimized and the occurrence of short circuits in the magnetic flux is avoided. In addition, the driver efficiency and torque output is increased to a considerable degree in this manner. More particularly it is sufficient that only the traversed section is magnetizable or magnetically conductive, while the other sections of the bending element can be manufactured from non-magnetizable material. In order to maintain the symmetry between the first and the second magnetic circuit that results solely from the magnet-induced flux, it is provided according to another advantageous embodiment of the invention that, as for its first and second half, the pole shoe is embodied symmetrically with respect to an axis that extends perpendicularly to the longitudinal axis of the bending element and symmetrically through the magnet and the magnetizable section of the bending element.

Further it can be provided that the pole shoe is formed as one piece or comprises a first stator core and a second stator core that is separate from the same, which form the first and the second half of the pole shoe and are preferably formed so as to be substantially C-shaped. Preferably, the magnet is arranged in a symmetrical manner between the two stator cores in such a manner that it connects the two stator cores with each other. Alternatively, the two stator cores can directly adjoin each other, wherein the magnet is magnetically coupled in the adjacence area to the two stator cores. In addition it can be advantageously provided that the pole shoe is formed so as to be substantially rectangular, O-shaped or D-shaped and comprises an interruption for creating the two free ends, with the magnetizable section of the bending element being arranged inside the interruption. In this manner it is achieved that the free ends of the pole shoe or the first and second pole shoe halves or the stator cores reach as close as possible to the bending element, so that the magnetic flux between the bending element and the stator cores couples with maximal efficiency and without stray losses. Further it is preferred that the free ends of the pole shoe or the first and second pole shoe halves or the stator cores on the one hand and the edges of the bending element in the magnetizable section on the other hand are embodied so as to be chamfered or so as to be formed in a manner that results in an extensive geometric superimposition between the free ends and the adjoining edges or rims of the bending element.

For supporting the magnetic flux in the first and the second magnetic circuit it is provided according to a further advantageous embodiment of the invention that the magnet and the pole shoe or the magnet and the two halves of the pole shoe are magnetically coupled to each other via a reflux element.

In order to achieve that the conduction of the magnetic flux which is generated by the magnet and the drive coils is as good as possible in both magnetically soft parts of the magnetic circuits, according to another advantageous embodiment the reflux element, the pole shoe, the first stator core and/or the second stator core consist of a ferromagnetic material, sintered ferritic or ferromagnetic powder. Preferably, stainless steel, nickel-cobalt, iron, in particular of soft iron, or a combination of these materials may be chosen as ferromagnetic materials of high permeability.

Another possible embodiment relates to the embodiment of the reflux element, of the pole shoe, of the first stator core and/or of the second stator core as an assembly of lamellae that are made of ferromagnetic and/or magnetically soft material and that are isolated from each other. Suitable materials are sheets of FeSi, NiFe or CoFe, a pressed soft magnetic composite (SMC) or sintered soft ferrite. Suitable sheet thicknesses lie within the range of 0.1 to 0.5 mm.

According to another further aspect, both stator cores and the [reflux element] can consist of a single piece.

Sintered powders or laminated ferromagnetic materials are characterized by a particularly low volume resistivity and a high saturation flux density. Since the eddy flow is inversely proportional to the volume resistivity, the generation of eddy currents can be considerably reduced and the driver efficiency can be effectively increased in this manner.

When lamellae stacks of ferromagnetic material are used, the thickness of the individual lamella is preferably approximately 0.02 mm to approximately 0.15 mm, and the thickness of the entire stack is approximately 2 mm to approximately 25 mm. Further it is preferred that the individual lamellae are separated from each other by thin layers of an insulating material, for example of an insulation varnish or the like.

Furthermore, in order to increase the coupling efficiency and to minimize stray losses, it is provided according to another advantageous invention that only a small air gap in the range of 0.5 mm to 1.5 mm is provided between the magnetizable section and the magnet as well the free ends of the pole shoe, with the air gap being chosen in such a manner that the bending element can oscillate in a collision-free manner between the magnet and the free ends of the pole shoe, and that it is maximally penetrated by the magnetic fluxes.

According to a further advantageous embodiment of the invention, the bending element is fixated at both ends with respect to its longitudinal axis inside respectively one end bracket, which can preferably be made of a non-magnetic material, since it does not have to contribute to the support of the magnetic flux.

Further, a base plate that is preferably made of a non-magnetic material can be provided, on which the end brackets, the reflux element, the pole shoe, the first stator core, the second stator core and/or the magnet are fixedly attached. This is particularly practical in the case of a single-piece stator comprising a reflux element.

According to another advantageous embodiment of the invention, as the magnet either an electromagnet or a permanent magnet can be used, preferably a dipole magnet that has a polar axis that is aligned perpendicularly to the longitudinal axis (A-A). An electromagnet has the advantage that the static magnetic flux that is generated by it and that runs through the first and second magnetic circuit, and thus also the amplitude of the scan angle can be varied in any desired way, without the need to vary the driver current through the drive coils.

A particularly suitable magnet is an element, in particular a cuboid, made of sintered NdFeB, which is anisotropically aligned in the preferred direction and which has a polar axis that is aligned in the direction of a symmetry axis of the pole shoe. The magnet is enclosed by a hollow profile with a very good electrical conductivity that preferably consists of copper. This hollow profile ensures a massive short circuit of the higher-frequency alternating fields and will be referred to as a short-circuited winding in the following.

For generating substantially symmetrical oscillations of the bending element, the bending element is formed so as to be substantially symmetrical with respect to its magnetizable section. Alternatively or additionally, the bending element's center of gravity is advantageously positioned symmetrically in the area of the magnetizable section of the bending element.

According to a further advantageous embodiment of the invention, the magnetizable section is configured as a central element of the bending element, with two connecting arms extending from it in a diametrical manner, which are respectively connected to one end lug, in particular a trapezoid one, for fixing the bending element inside the end brackets. Such an embodiment of the bending element is characterized by a high degree of symmetry and particularly good oscillation properties.

Further it is advantageously provided that the central element is configured in a planar, in particular disk-shaped manner and/or extends beyond the connecting arms in the direction of the stators obliquely to the longitudinal direction of the bending element. Further, the connecting arms are preferably formed so as to be thin and have a rectangular cross-section, in order to particularly support rotary oscillations.

The shape of the oscillations can generally be complex, as the bending element can oscillate in more than one mode depending on its shape and the material used. In this way, harmonic oscillations of the basic mode and modes of a higher order can develop. In particular, the spring constant of the bending element for example depends on its length, width and thickness as well as the used material, among other things. By using suitable numerical methods in designing of the bending element, a certain harmonic mode or a certain combination of modes can be favored. Thus, it is provided according to another advantageous embodiment of the invention that the oscillation shapes or oscillation modes of the bending element are influenced or predefined with respect to their frequency and amplitude by means of a suitable shape determination or design and/or by using a suitable material, for example so as to increase the amplitude of the torsional oscillation of the first order over all other modes by at least one order of magnitude.

According to a further advantageous embodiment of the invention, the bending element at least partially consists of a ferromagnetic material or of a fiber composite material or a combination of these materials. Preferably, the central element, which can also be referred to as an anchor, the oscillation arms and the end lugs are manufactured as single-piece components and/or at least partially from a ferromagnetic material. However, it is not necessary for all elements of the bending element or for the entire bending element to consist of a ferromagnetic material or to be magnetic. Only the partial area through which the first and second magnetic circuits flow, or the central element, has to be magnetizable at least in certain parts or has to be made of ferromagnetic material. This in particular refers to the central element which defines the working air gaps. Alternatively it is possible that the bending element is made of a fiber composite material that either contains ferromagnetic material or onto which ferromagnetic material is applied, for example in the form of a coating or an insert component.

Since the scanning device according to the invention is in particular configured as an optical resonance scanner, according to another advantageous embodiment of the invention the bending element comprises at least one light-reflecting and/or light-emitting and/or light-detecting element, for example a polished surface, a mirror or a diffraction grating, in its magnetizable section and/or on the central element, more particularly on its side that is facing away from the magnet.

According to another advantageous embodiment of the invention, an optical sensor system with a light source and an intensity-sensitive and/or position-sensitive detector is provided, preferably above the bending element, for the purpose of detecting the entire oscillation amplitude and/or oscillation frequency of the oscillating bending element. This represents an advantage, since a useful beam of the system is deflected at the same position. What is significant here is that the entire oscillation amplitude and not only a partial area can be detected by means of the optical sensor system, so that the entire amplitude can be controlled by means of a respective control device. In this manner, in addition to the frequency also the deflection of the oscillating bending element can be controlled, so that a more precise regulation is possible and any influence of environmental conditions can be compensated for. In addition, the possible application range of the scanning device according to the invention is increased thanks to the regulation of the amplitude.

Preferably, the light source emits a beam of light in the direction of the central element of the bending element, which from there is reflected in the direction of the optical detector, wherein the detector detects the modulation of the reflected beam of light depending on the central element's angle of rotation. In particular, the sensor system is suitable for detecting the entire oscillation amplitude and the oscillation frequency as well as possible distortions of the oscillation, which may for example be caused by a defective bending element. For the purpose of detecting the entire oscillation amplitude, the reflection point preferably lies in the centroid of the central element's area. Further, with this sensor system the oscillation frequency can be detected at the same time so as to control and regulate it, for example in order to keep the bending element in resonance.

The light source can be a coherent or non-coherent light source, for example an LED (light emitting diode) or a laser diode. As the detector, a so-called position sensitive device (PSD), a so-called charge coupled device (CCD), an arrangement of discrete photo diodes or the like is conceivable, for example.

According to another aspect of the present invention, a measuring system for determining the angle of rotation and a corresponding control circuit, in particular in a power amplifier, are provided for stabilizing the pivoting range of the central element. In this way, the amplitude of the central element can be kept constant. Moreover, wobble oscillations of the anchor and thus of the mirror can be avoided in this way, which is effected by means of so-called horizontal transverse forces through a planar position of both pole surfaces of the anchor in one plane.

A variation of the vertical forces can be prevented according to a further embodiment by means of sheathing the magnet with a short-circuited winding made of material with good electrical conductivity.

It is provided in another aspect of the present invention that the pole surfaces of the anchor form a smooth and even anchor bottom side throughout, i.e. the side facing the pole surfaces of the stator, in order to ensure a planar position of the pole surfaces of the anchor.

The oscillating element can consist of a magnetically soft anchor, which is suspended and fixated between the torsion springs in such a way that functionally desired torsional oscillations may be performed around this torsion axis. An optical mirror, which deflects the light or laser beam, is attached to the anchor. The resonance frequency $f_o$ results from the torsion spring constant $C_T$ and the mass moment of inertia $J_A$ of the moved masses with respect to the pivot point A:

$$fo = \frac{1}{2\Pi}\sqrt{CT/JA}$$

In a case according to one embodiment of the invention, the supports, the torsion springs and the mirrors can be manufactured from a single piece. If this material is magnetically soft, the mirror can also be used as an anchor for an electromagnetic drive. In this way, manufacturing time and above all weight can be reduced.

The drive serves for exciting the system to oscillate at its resonance frequency $f_o$ and to compensate for the damping of the oscillating system. These losses are mainly caused by the air resistance of the oscillating part and only to a small degree by the lattice movements in the torsion bar, as well as in the drive during the generation of the alternating flux in the form of current heat losses in the winding and through hysteresis losses in the magnetic circuit parts.

The drive does not necessarily have to generate a sinusoidal course of the torsional moment. A balanced state is created between the losses $P_v$ that depend on the deflection a and the frequency f and the mechanical performance $P_M$ that is periodically supplied by the torsional moment:

$$P_v=f(a;f)=P_M=2\pi f^*M$$

According to a further embodiment, the stator, which usually is a magnetically soft circuit, is a U-yoke or C-yoke, where appropriate comprising a winding that is symmetrically distributed between both legs.

In some embodiments, a permanent magnet is arranged in a manner symmetrical to the legs from the base of the yoke up to just below the anchor, effecting a constant field pre-magnetization of the magnetic circuit. An air gap that is present between the magnet and the anchor serves for ensuring the anchor's freedom of movement.

The anchor that is mounted in a rotatable manner centrically above the magnet forms working air gaps together with pole surfaces of the two legs. The magnetic flux that is in particular excited in a permanent-magnetic manner traverses the air gap between the magnet and the anchor. In the anchor, the flux is divided to both sides towards the working air gaps, passes these, flows into the outer legs, the back of the yoke and is closed again inside the magnet.

In some embodiments, coils that are preferably connected in series on the outer legs generate an electrically excited magnetic flux in a manner proportional to the current, with the magnetic flux having the same direction as the preferably permanent-magnetically generated flux in one working air gap, and having the opposite direction in the other working air gap. Based on the differing fluxes, a difference in forces is now created between the forces that are applied in the working air gaps at the anchor. Thus, a torsional moment on the mirror is created via the lever arm.

The force acting on the boundary surfaces $A_\delta$ in the air gap $\delta$ as a result of a magnetic flux $\phi$ is calculated as:

$$F=\phi^2/(2\mu_0 * A_\delta)$$

Currentless and with the anchor being in a non-deflected state, both permanent-magnetic partial fluxes $\phi_P$ are identical and thus the resulting force for torsional moment generation is zero. The electrically excited flux $\phi_{el}$ is generated proportionally to the current. As follows from the force equation $F_{res}=F_{\delta 1}-F_{\delta 2}$:

$$(\phi_P+\phi_{el})^2-(\phi_P-\phi_{el})^2=4\phi_P*\phi_{el}M\sim\phi_P*i$$

Consequently, the resulting force and thus the torsional moment are proportional to the permanent-magnetically excited flux and to the current. The lever arm length according to the angle of attack at the pivot point also has a direct influence. Hence, the resulting forces and the torsional moment are also proportional to the remanence induction of the permanent magnet, but the attraction forces at the boundary surfaces of the air gap show a quadratic dependence.

According to one embodiment of the invention, wobbling motions can be counteracted in some embodiments through a solid short-circuit sleeve or short-circuited winding. Such a short-circuited winding can consist of copper, enclosing the permanent magnet. The variations of the magnetic flux in the magnet are prevented (damped) and thus also the periodical ones with $2f_o$ variations of the vertical forces.

In some variants of the scanning device according to the invention, transverse forces are avoided through horizontally level pole surfaces at the anchor. In this manner, substantially only vertical forces can act at these boundary surfaces. This has the additional advantage that the largest possible lever arm for torsional moment generation is achieved in this manner.

It can be provided in another aspect of the invention that the smooth bottom side is interrupted by magnetically soft superstructures at least in the surface measurements of the permanent magnets for the purpose of taking over the permanent-magnetic flux.

Moreover, it can be provided in some embodiments that the short-circuited winding consists of a hollow profile made of copper, into which the magnet, in particular the permanent magnet, fits. The short-circuited winding is preferably no longer than the magnet and has a wall thickness of at least 0.2 mm, but preferably 1 to 2 mm.

In another embodiment, the short-circuited winding can also consist of a copper sheet that is bent around the magnet, with the point of contact at the edges being closed, in particular welded or soldered to each other. The copper sheet can have the previously mentioned thicknesses. Alternatively, the short-circuited winding can also be made of aluminum or another material with good electrical conductivity.

In another further aspect of the scanning device according to the invention it is provided that free ends of the pole shoes are oriented towards the magnetizable section in such a manner that a minimal parallel air gap results in the event of a maximal deflection of the magnetizable section. This is an additional help when it comes to suppressing wobbling motions.

According to another further aspect, the front side of the magnet that is facing towards the magnetizable section can be aligned in parallel to the magnetizable section in the inactive state of the magnetizable section.

According to another aspect that is leading beyond that, it can further be provided that the free ends of the pole shoes and a front side of the magnet that is facing towards the magnetizable section and the magnetizable section are arranged so as to be positioned on top of each other in a projection along the symmetry axis of the pole shoe.

In this manner, it is possible to ensure that forces are always applied vertically into the magnetizable section or the anchor, and that wobbling motions of the same are avoided in an effective manner.

The efficiency of the prevention of wobbling motions of the magnetizable section is further increased by the additional provision of the short-circuited winding.

In another possible aspect of the present invention it is provided that the stator is made of a lamellated stack of sheets of preferably magnetically soft material of a thickness of 0.05 to 0.5 mm on the basis of unalloyed or low-alloy steel, FeSi, FeCo, FeNi or an iron powder composite material, so-called soft magnetic composite (SMC), but also of sintered soft ferrite.

According to another advantageous embodiment of the invention, a control device is provided for the purpose of a variable regulation of the preferably entire oscillation amplitude and/or for the stabilization of the oscillation amplitude across a broad temperature range and/or for the purpose of maximizing the resolution of the oscillation amplitude, with the control device being operatively connected to the optical sensor system and/or the first and the second drive coil, and being controllable and/or adjustable across the entire oscillation amplitude and/or the oscillation frequency of the bending element. Thus, the scanner can also be advantageously operated under non-constant environmental influences. When the scanner is used as a display system or in a laser material processing system, the regulation of the amplitude further makes the use of an expensive zoom optics system for the scanned beam unnecessary when it comes to varying the size of the scan field. The size of the scan field can be regulated in a simple manner by means of varying the amplitude.

Further objectives, advantages, features and application possibilities of the present invention follow from the following description of an exemplary embodiment by referring to the drawings. Here, all described and/or illustrated features form the subject matter of the present invention either individually or in any useful combination, also irrespective of their compilation in the claims or the claims to which they refer back.

DESCRIPTION OF THE DRAWINGS

Herein.

DETAILED DESCRIPTION

With a view to better readability, structural components of different embodiments that are identical or have the same effect are identified by the same reference signs in the following figures.

FIGS. 1-4 show a possible exemplary embodiment of an optical resonance scanner 100, comprising an optical sensor system 40 according to the present invention. The optical sensor system 40 is of the type of a torsional resonance oscillator.

Figure 1:
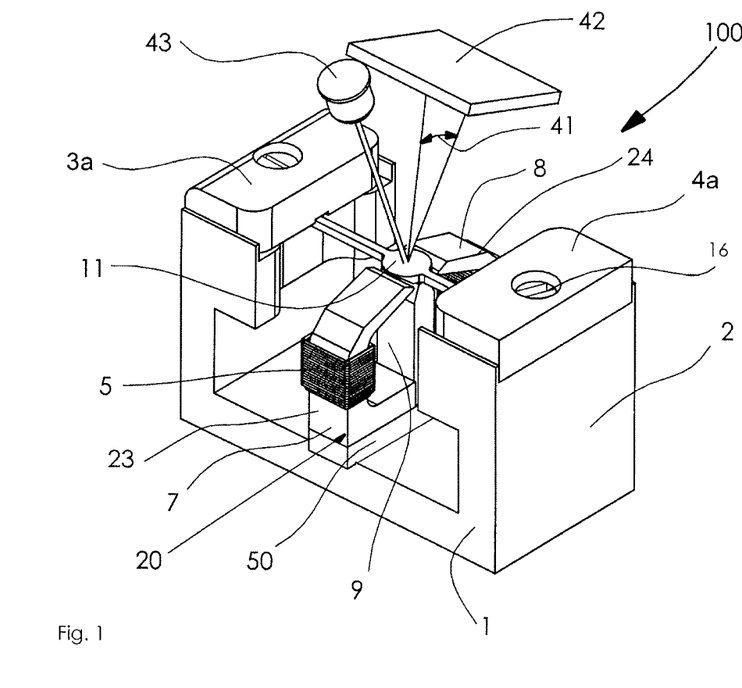
FIG. 1 shows a perspective view of a possible embodiment of an optical resonance scanner, comprising an optical sensor system according to the present invention.
Figure 2:
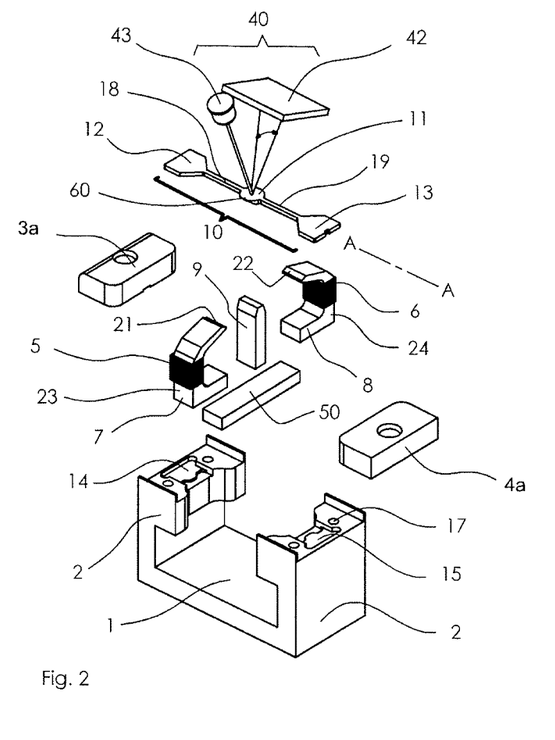
FIG. 2 shows an exploded view of the optical resonance scanner according to FIG. 1.
Figure 3:
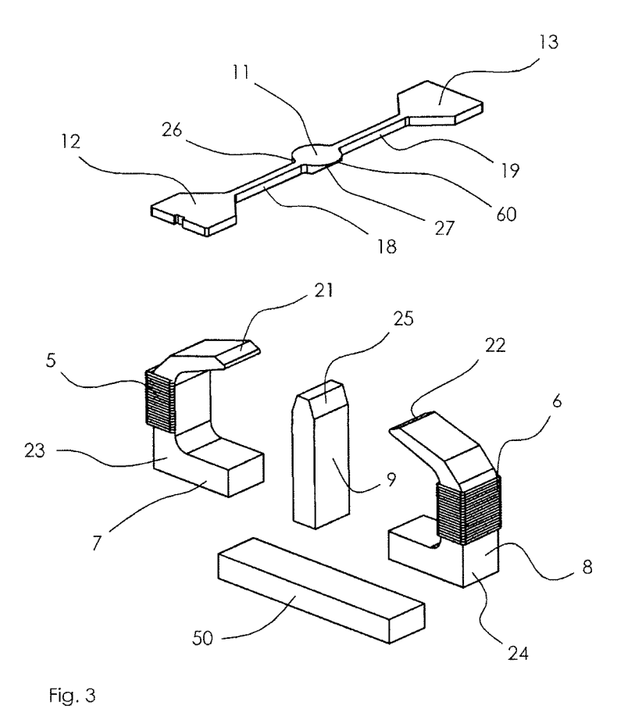
FIG. 3 shows an exploded view of the electromagnetic drive components of the optical resonance scanner according to FIG. 1.

As far as FIGS. 1 and 2 are concerned, the scanner 100 comprises a substantially C-shaped base plate 1, which forms the mechanical support for the scanner 100. Together with two fixation plates 3a, 4a, the two short flanks of the C-shaped base plate 1 form end brackets 2 for receiving and fixating an elongated, spring-elastic bending element 10. For fixating the bending element 10 or for mounting the fixation plates 3a, 4a on the short flanks of the C-shaped base plate 1, the fixation plates 3a, 4a have recessed screw holes, through which the screws 16 can be screwed through the retaining plates 3a, 4a into corresponding threaded holes 17 in the short flanks of the base plate 1. Alternatively, the base plate 1 and the fixation plates 3a, 4a can also be configured as a single part.

As far as FIGS. 1 to 4 are concerned, the scanner 100 comprises the bending element 10 as an essential structural component that is fixated at both its ends with respect to its longitudinal axis A-A inside the end brackets 2. Further, at its center of gravity S or center, the bending element has a magnetizable section 60 that serves as the actual rotating or oscillating element of the scanner 100. The magnetizable section 60 is configured as the central element 11 of the bending element 10, with two oscillation arms 18, 19 extending from it in a diametral manner, thus forming the longitudinal axis A-A, with the oscillation arms 18, 19 being connected to respectively one end lug 12, 13 for fixating the bending element inside the end brackets 2, which in the present exemplary embodiment are trapezoidal in shape. The oscillation arms 18, 19 form torsion springs. The bending element 10 with the central element 11, oscillation arms 18, 19 and end lugs 12, 13 is preferably configured as a single piece, as in the present exemplary embodiment. In order to facilitate a rotary oscillation of the bending element around its longitudinal axis A-A, the oscillation arms 18, 19 are preferably configured so as to have a thin and rectangular cross-section, as is the case in the present exemplary embodiment.

As has been described earlier, the end lugs 12, 13 of the bending element 10 are fixated inside the end brackets 2. For this purpose, in the present exemplary embodiment the front surfaces of the two short flanks of the C-shaped base plate 1 have recesses 14, 15, inside of which the end lugs 12, 13 are received and clamped in place with the fixation plates 3a, 4a and the screws 16.

Alternatively, the end lugs 12, 13 can also be welded on or directly screwed to the base plate 1. It is preferred that the attachment means are configured in such a manner, that none of the areas of the bending element 10 that participate in the rotary oscillation are obstructed.

Further, the central element 11 is configured in a planar, more particularly disk-shaped manner, and extends beyond the oscillation arms 18, 19 obliquely to the longitudinal direction A-A of the bending element 10, so that a generally elliptical or circular shape results as seen in top view.

Further, the central element 11 comprises one or multiple light-reflecting, light-emitting or light-detecting elements, such as for example a polished surface of the central element 11, a vapor-deposited metal film, a multi-layer thin-film reflector, a diffraction grating or a mirror with a reflecting surface. In the present exemplary embodiment, the surface of the circular central element 11 is polished and thus serves as a light-reflecting element.

As far as FIGS. 1 to 4 are concerned, a magnet 9 is arranged below the central element 11 and at a distance to the bending element 10. The magnet 9 can for example be a permanent magnet, an electromagnet or the like. According to the invention, the magnet 9 is arranged in such a manner that the magnetic flux $\phi_M$ that is generated by it is directed symmetrically into or out of the magnetizable section 60 of the bending element 10 perpendicularly to its longitudinal axis A-A. It is preferred that the magnet 9 is a dipole magnet, wherein the polar axis is oriented in the vertical direction perpendicularly to the longitudinal axis A-A of the bending element 10, just as is the case in the present exemplary embodiment. Further it is preferred that the air gap between the bending element 10 and the magnet 9, in particular between the pole tip 25, is so small that the magnetic flux $\phi_M$ of the magnet 9 couples as efficiently as possible into the central element 11 or the magnetizable section 60 of the bending element 10. The magnet 9 may have any desired shape. In the present case, the magnet 9 is substantially cube-shaped with a chamfered pole tip 25. But it is also conceivable that the magnet 9 is formed so as to be generally cylindrical.

According to the invention, a first and a second stator core 7, 8 are arranged at the opposing long sides of the magnet 9, with a first or a second electromagnetic drive coil 5, 6 being wound around them. The first and the second stator core 7, 8 form the first and second half 23, 24 of a pole shoe 20. The pole shoe 20 is configured symmetrically with respect to an axis B-B, which extends perpendicularly to the longitudinal axis A-A of the bending element 10 and symmetrically through the magnet 9 and the magnetizable section 60 of the bending element 10.

Preferably, the first and the second drive coil 5, 6 are wound in opposite directions and have the same number of windings. The two stator cores 7, 8 and the magnet 9 are magnetically coupled via a reflux element 50. According to the invention, the bending element 10 is arranged symmetrically between the open ends 21, 22 of the pole shoe 20 or of the two stator cores 7, 8 in such a manner that between the magnetizable section 60 of the bending element 10 and the first stator core 7 or between the magnetizable section 60 of the bending element 10 and the second stator core 8 a magnetic flux, more particularly a magnetic flux $\phi_1$, $\phi_2$ that is generated by the first or the second drive coil 5, 6 can be transferred substantially perpendicularly to the longitudinal axis A-A.

Consequently, the stator cores 7, 8 are arranged at a right angle to the longitudinal axis A-A of the bending element 10 and at the same distance to the magnet 9 and the bending element 10. The stator cores 7, 8 end just short of the outer edges 26, 27 of the bending element 10, so that only a narrow air gap is created between the tips 21, 22 of the stator cores 7, 8 and the central element 11 of the bending element 10. In the present exemplary embodiment, the first stator core 7 and the second stator core 8 are configured so as to be substantially C-shaped. Further it is preferred that the ends 21, 22 are angled and chamfered or formed in such a manner that an extensive geometrical superimposition results between the ends 21, 22 and the edges 26, 27 of the bending element 10, as is the case in the present exemplary embodiment.

According to the invention, the magnet 9 is also magnetically coupled to the reflux element 50 and arranged symmetrically with respect to the free ends 21, 22 of the first and second stator core 7, 8 in such a manner that a first and a second magnetic circuit 30, 31 are formed through the magnet 9, the reflux element 50 and the first stator 7, or through the magnet 9, the reflux element 50 and the second stator 8, extending in opposite senses with respect to one another in a plane perpendicularly to the longitudinal axis A-A through the magnetizable section 60 of the bending element 10.

At that, identical and opposing superimpositions of the magnetic fluxes $\Psi_1$, $\Psi_2$, $\Omega_M$ cause a torsional force to act on the bending element 10, which as a result performs a rotary oscillation around its longitudinal axis A-A. The air gaps between the central element 11 and the magnet 9 as well as the free ends 21, 22 of the stator cores 7, 8 are chosen so as to be just large enough for the central element 11 to oscillate in a collision-free manner between the magnet 9 and the free ends 21, 22 of the stator cores 7, 8, and for being maximally penetrated by the magnetic fluxes $\phi_1$, $\phi_2$, $\phi_M$.

The reflux element 50 is connected in a force-fitting manner to the base plate 1, preferably clamped or glued on. The stator cores 7, 8 are in turn attached to the reflux element 50, so that they form a substantially D-shaped pole shoe together with the reflux element 50, with the D-shaped pole shoe comprising an interruption between the free ends 21, 22 of the first and second stator cores 7, 8 inside of which the central element 11 of the bending element 10 is arranged. FIGS. 1 to 4 show the reflux element 50 and the two stator cores 7, 8 as individual components. In an alternative embodiment, the reflux element 50 and the stator cores 7, 8 can also be configured as a single piece.

The magnet 9 is also attached to the reflux element 50 by means of clamped, adhesive or screw connections. Alternatively, the magnet 9 and the reflux element 50 and/or the stator cores 7, 8 can also be configured as a single piece.

The central element 11, the stator cores 7, 8, the magnet 9 and/or the reflux element 50 are preferably made of ferromagnetic materials. Preferably, also the bending element 10, the oscillation arms 18, 19 and/or the end lugs 12, 13 are made at least partially from a ferromagnetic material. However, it is not necessary that all elements of the bending element 10 are made of ferromagnetic material or are magnetic. Only the section 60 or the central element 11 has to be magnetically conductive or magnetizable. As ferromagnetic materials particularly stainless steel, nickel-cobalt and iron or a combination of these materials may be used.

Preferably, the bending element 10 is made of spring steel and together with the oscillation arms 18, 19 forms a torsion spring, with its spring constant being determined by the length, width and thickness as well as the material of the oscillation arms 18, 19. Alternatively, it is possible that the bending element 10 consists of a fiber composite material that either contains ferromagnetic material or onto which ferromagnetic material is applied in a force-fitting manner, for example by means of coating.

In contrast to that, the pole shoe 20 or the stator cores 7, 8 and/or the reflux element 50 preferably consist of soft iron or sintered ferrite powder or a laminated ferromagnetic material, for example of multiple thin layers of a ferromagnetic material which are isolated from each other.

If lamellae stacks made of ferromagnetic material are used, the thickness per lamella is preferably approximately 0.02 mm to approximately 0.15 mm, while the entire thickness of the stack is in the range of approximately 2 mm to approximately 25 mm. It is also preferred that the individual lamellae are separated from each other via extremely thin layers made from an insulating material, for example varnish or the like. Such lamellae stacks made of ferromagnetic material have a high saturation flux density and minimize the formation of eddy currents.

The other components of the scanner 100 can consist of non-ferromagnetic material, as long as they do not contribute to the conduction and support of the magnetic fluxes $\phi_1$, $\phi_2$, $\phi_M$. The base plate 1 and the end brackets 2 or the fixation plates 3a, 4a can be made of any material which ensures a stable fixation of the bending element 10.

In the present exemplary embodiment according to FIGS. 1 and 2, the scanner 100 is equipped with an optical sensor system 40, which is configured for the purpose of detecting the entire oscillation movement of the central element 11. For this purpose, in the present exemplary embodiment the sensor system has a light-emitting element or a light source 43 that emits a beam of light in the direction of the central element 11 of the bending element 10, which is reflected at that location and then impinges at an clamping angle 41 on the optical detector 42 that is suitable for detecting the modulation of the beam of light proportionally to the angle of rotation of the central element 11. In particular, the present optical sensor system has the ability to detect the entire oscillation amplitude, the oscillation frequency as well as possible distortions of the oscillation, which may be caused by a defective bending element 10, for example.

The light source 43 can be a coherent or a non-coherent light source, such as for example an LED (light emitting diode) or laser diode. As a detector, for example a so-called "position sensitive device" (PSD), a so-called "charge coupled device" (CCD), an arrangement of discrete photo diodes or the like can be used.

Preferably, the reflection point lies in the centroid of the area of the central element 11, so that the entire oscillation amplitude can be detected in an effective manner. In the exemplary embodiment that is shown herein, due to lack of space it is not possible to arrange the sensor system 40 below the central element 11, wherein an arrangement of the sensor system 40 below the oscillation arms 18, 19 would not be efficient anyway to detect the entire oscillation amplitude of the central element 11. For this reason, in the present exemplary embodiment the optical sensor system 40 is arranged above the central element 11.

Further, a control device that is not shown here can be provided, which is operatively connected to the optical sensor system 40 and/or the first and the second drive coil 5, 6 and which controls and/or regulates the oscillation amplitude and/or the oscillation frequency. Thanks to this regulation it is also possible to selectively alter the dynamic range, for example in order to achieve a zoom effect, without an elaborate optical system having to be provided.

In the following, the operating principle of the scanning device 100 is explained: If the drive coils 5, 6 are currentless, the scanning device 100 is only penetrated by the static magnetic flux $\phi_M$ of the magnet 9. If, as shown in 4, the magnet 9 is for example a dipole permanent magnet, with its north pole being positioned directly opposite the central element 11 and its south pole being coupled to the reflux element 50, the constant magnetic flux $\phi_M$ that is generated by the magnet 9 extends from the north pole vertically upwards and into the central element 11 of the bending element 10 via the air gap. As can further be seen from FIG. 4, the flux is divided into the two generally symmetrical, coplanar magnetic circuits, namely the first magnetic circuit 30 and the second magnetic circuit 31, which run in opposite directions perpendicularly to the longitudinal axis A-A of the bending element 10. The first magnetic circuit 30 extends from the pole tip 25 of the magnet 9 to the approximate center of gravity of the central element 11, or the magnetizable section 60 of the bending element 10, laterally further on via the edge 28 of the central element 11 and the air gap to the free end 21 of the stator core 7, then further through the stator core 7 and the left half of the reflux element 50 back into the magnet 9. The second magnetic circuit 31 extends from the pole tip 25 of the magnet 9 to the approximate center of gravity of the central element 11 or the magnetizable section 60 of the bending element 10, laterally further on via the edge 29 of the central element 11 and the air gap to the free end 22 of the stator core 8, then further on through the stator core 8 and the right half of the reflux element 50 back into the magnet 9. Consequently, both magnetic circuits 30, 31 are united in the reflux element 50 below the magnet 9 or in the south pole of the magnet 9.

Figure 4:
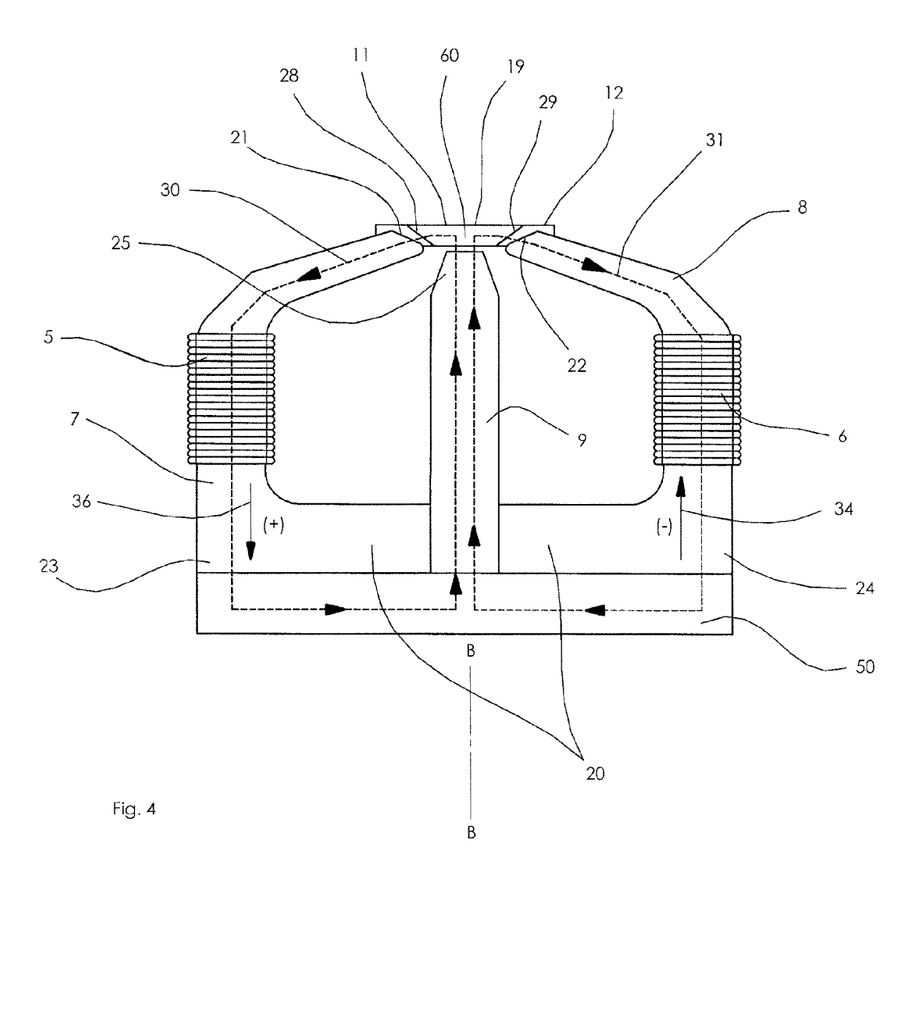
FIG. 4 shows a side view of the electromagnetic drive components according to FIG. 3.

Instead of a permanent magnet, the magnet 9 can also be configured as an electromagnet. In this manner it is achieved in an advantageous manner that the static (DC) magnetic flux $\phi_M$ that is generated by the magnet 9 and runs through the first and second magnetic circuit 30, 31, and thus also the amplitude of the scan angle, can be altered in any desired manner, without having to modify the driver current through the drive coils 5, 6.

The magnetic circuits 30, 31 that are generated by the magnet 9 alone extend in opposite senses with respect to one another and are configured in a symmetrical manner due to the symmetrical arrangement of the magnet 9 relative to the stator cores 7, 8 and the central element 11 of the bending element 10. These become asymmetrical when an electrical alternating current driver signal, e.g., a sinusoidal signal or a square wave signal, is applied to the drive coils 5, 6.

Because in the present exemplary embodiment the drive coils 5, 6 are wound onto the stator cores 7, 8 with the same number of windings, but in opposite directions, a magnetic flux $\phi_1$ is induced in the first stator core 7, and a magnetic flux $\phi_2$ of the same amount, but an orientation opposite to the magnetic flux $\phi_1$ of the first stator core 7 is induced in the second stator core 8, if an electrical alternating current driver signal is applied in a symmetrical manner. In the present exemplary embodiment, the alternating current driver signal is chosen in such a way that the magnetic flux $\phi_2$ that is generated at a certain point in time in the drive coil 6—as indicated by the arrow 34 in FIG. 4—reduces or even eliminates a part of the flux $\phi_M$ induced by the magnet 9 in the magnetic circuit 31. Reversely, the drive coil 5 generates an identical, but inverted electromagnetic flux $\phi_1$, which—as indicated by the arrow 36 in FIG. 4—amplifies the flux $\phi_M$ induced by the magnet 9 in the magnetic circuit 30 as soon as the amplitude of the driver signal reaches its maximum.

When the driver signal has reached its maximal positive amplitude, the magnetic field that is generated in the stator core 7 is concentrated in the free end 21 and flows via the air gap to the edge 28 of the bending element 10. This field amplifies the existing static magnetic flux $\phi_M$ at the edge 28 that is generated by the magnet 9. The flux density is thus amplified and increases the attractive force between the edge 28 and the free ends 21 of the stator core 7. At the same time, the drive coil 6 creates a magnetic flux $\phi_2$ of opposite polarity in the stator core 8, decreasing the attractive force between the free end 22 of the stator core 8 and the edge 29 of the bending element 10. The asymmetry of the magnetic forces between the central element 11 and the free ends 21, 22 of the stator cores 7, 8 that is thus achieved causes a torque around the longitudinal axis A-A, as a result of which the central element 11 oscillates in the direction of the torque vector around the longitudinal axis A-A.

As the driver signal transitions from its positive maximal amplitude to the negative maximal amplitude, the directions of the coil-induced magnetic fluxes $\Psi_1$, $\phi_2$ are reversed. As a result, an opposite torque is applied to the central element 11, as a result of which the rotational direction of the central element 11 is reversed. As a result, through a periodic pole reversal of the coil-induced magnetic fluxes $\phi_1$, $\phi_2$ by means of a periodic driver signal, the bending element 10, more particularly the central element 11, is set into a forced rotary oscillation, with its frequency being directly dependent on the frequency of the driver signal, which is in particular of the same size.

Instead of being applied to both drive coils 5, 6 the driver signal can also be applied to only one of the two drive coils 5, 6, so that the magnetic flux through the one circuit is amplified, while the magnetic flux through the other circuit is reduced.

According to the present invention, the torsional moment onto the central element 11 is effected by a force that is proportional to the electric capacity that is applied to the drive coils 5, 6. If the frequency of the electric oscillation corresponds to the natural frequency of the bending element 10, oscillations with a large angular amplitude can be generated by means of a resonance rise even when the driving power is relatively low.

FIGS. 5 to 8 show another possible exemplary embodiment of an optical torsional resonance oscillator 100', comprising an optical sensor system 40 according to the present invention.

Figure 5:
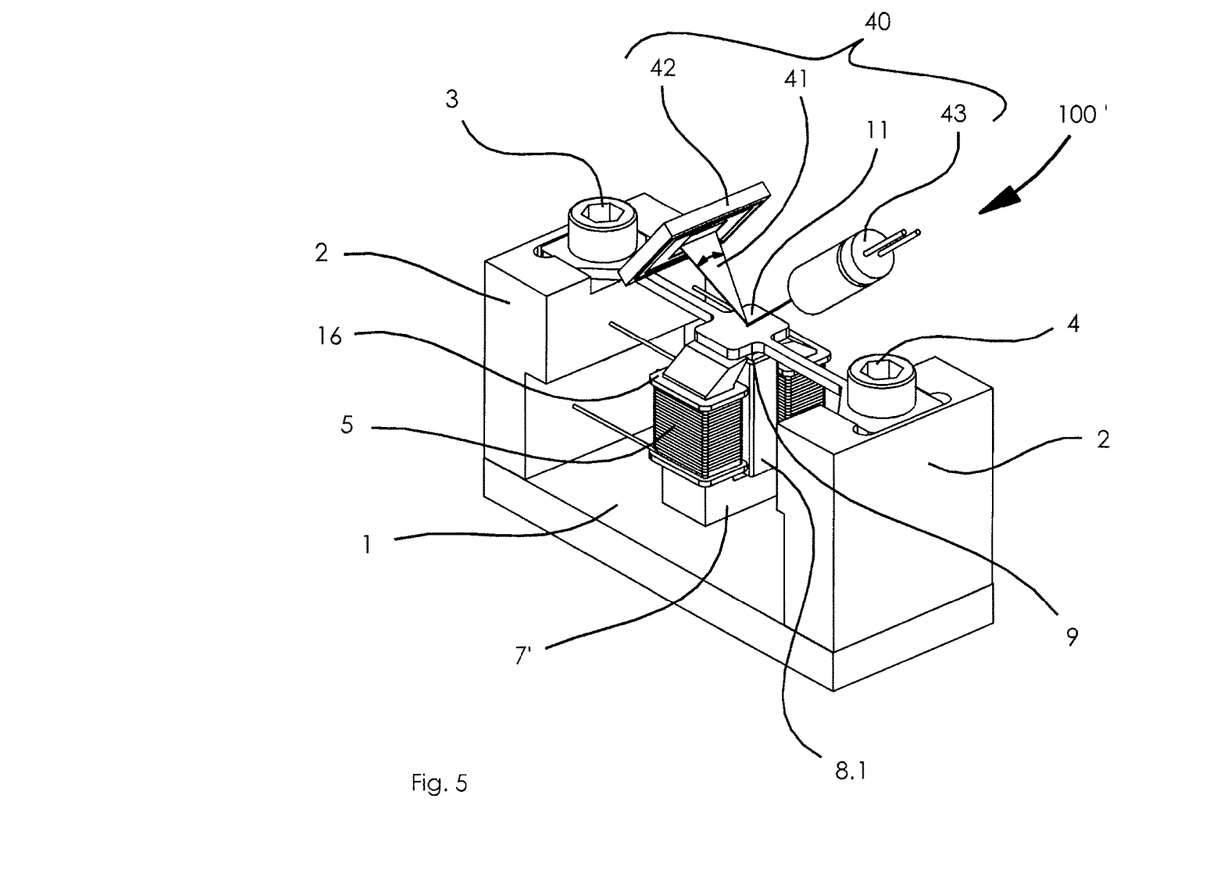
FIG. 5 shows a perspective view of another possible embodiment of an optical torsional resonance oscillator, comprising an optical sensor system according to the present invention.
Figure 6:
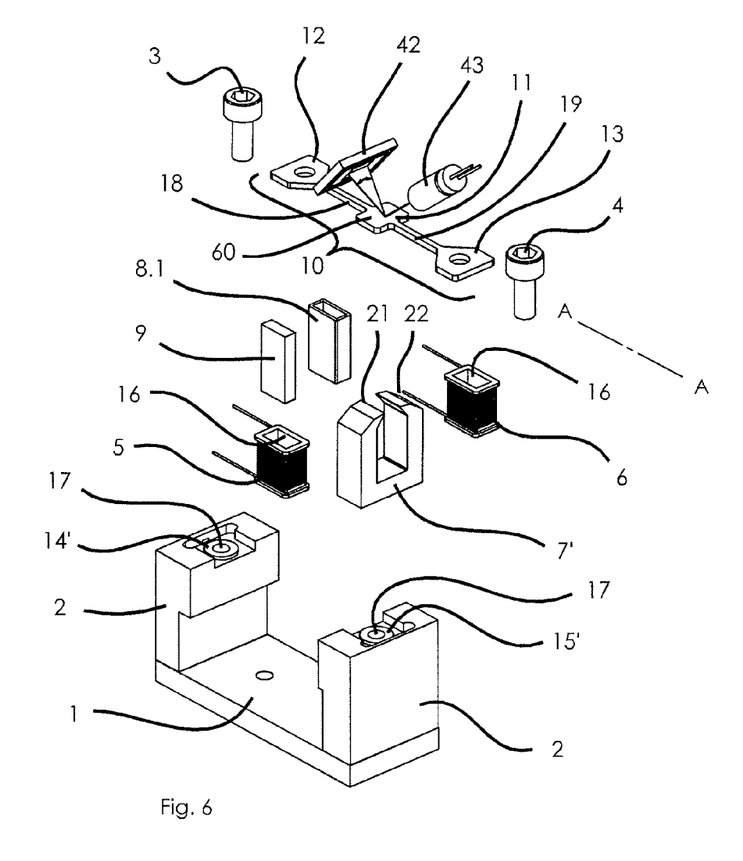
FIG. 6 shows an exploded view of the optical torsional resonance oscillator according to FIG. 5.
Figure 7:
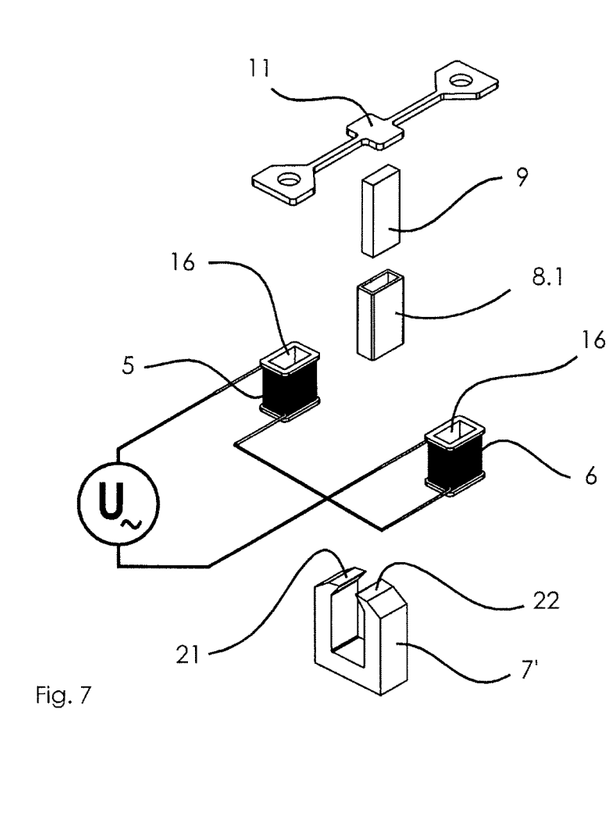
FIG. 7 shows an exploded view of the electromagnetic drive components of the optical torsional resonance oscillator according to FIG. 5.
Figure 8:
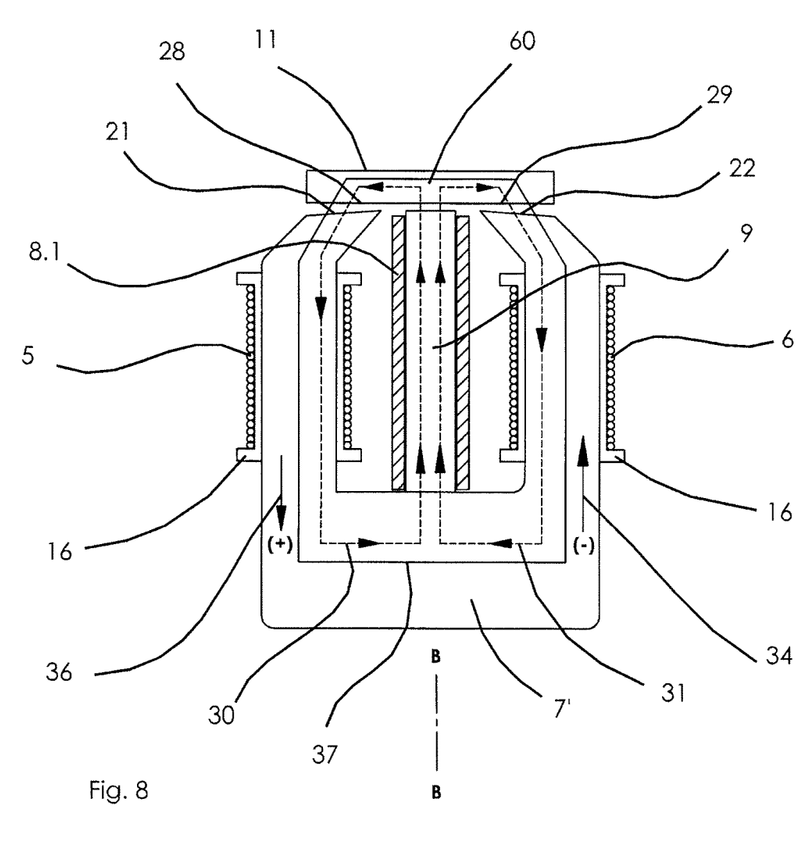
FIG. 8 shows a side view of the electromagnetic drive components according to FIG. 7.

As far as FIGS. 5 and 6 are concerned, the torsional resonance oscillator 100' comprises a substantially U-shaped base plate 1, which forms the mechanical support for the torsional resonance oscillator 100'. The two short flanks of the U-shaped base plate 1 together with two fixing screws 3, 4 and two end brackets 2 for receiving and fixating an elongated, spring-elastic bending element 10. The fixing screws 3, 4 are screwed into corresponding threaded holes 17 in the short flanks of the base plate 1 for the purpose of fixating the bending element 10 or for mounting the fixing screws 3, 4 on the short flanks of the U-shaped base plate 1.

As far as FIGS. 5 to 8 are concerned, the torsional resonance oscillator 100' comprises the bending element 10 as an essential structural component that is fixated inside the end brackets 2 at both of its ends with respect to its longitudinal axis A-A. Further, at its center of gravity S or center, the bending element has a magnetizable section 60 which serves as the actual oscillating element of the torsional resonance oscillator 100'. The magnetizable section 60 is configured as the anchor 60 of the bending element 10, with two oscillation arms 18, 19 extending therefrom in a diametral manner as torsion springs, thus forming the longitudinal axis A-A, and being connected to respectively one end lug 12, 13 for fixating the bending element inside the end brackets 2, which in the present exemplary embodiment are trapezoidal in shape. The bending element 10 with the anchor 60, oscillation arms 18, 19 and end lugs 12, 13 is preferably configured as a single piece, as in the present exemplary embodiment. In order to facilitate a rotary oscillation of the bending element around its longitudinal axis A-A, the oscillation arms 18, 19 are preferably configured so as to have a thin and rectangular cross-section, as is the case in the present exemplary embodiment.

As has been described earlier, the end lugs 12, 13 of the bending element 10 are fixated inside the end brackets 2. For this purpose, in the present exemplary embodiment, the front surfaces of the two short flanks of the U-shaped base plate 1 have supports 14, 15, inside of which the end lugs 12, 13 are received and clamped in place with the fixing screws 3, 4. Alternatively, the end lugs 12, 13 can also be welded. It is preferred that the attachment means are configured in such a manner that none of the areas of the bending element 10 that participate in the rotary oscillation are obstructed.

Further, the anchor 60 is configured in a planar, more particularly disk-shaped manner, and extends beyond the oscillation arms 18, 19 obliquely to the longitudinal direction A-A of the bending element 10, resulting in a generally elliptical or circular shape as seen in the top view.

On the side that is facing away from the working air gaps, the anchor 60 comprises one or multiple light-reflecting, light-emitting or light-detecting elements 11, for example a polished surface, a vapor-deposited metal film, a multi-layer thin-film reflector, a diffraction grating or a mirror with a reflecting surface. In the present exemplary embodiment, the surface is integrated into the anchor 60 in a circular manner, polished, and serves as the light-reflecting element 11.

As far as FIGS. 5 to 8 are concerned, a magnet 9 is arranged below the anchor 60 at a distance to the bending element 10. The magnet 9 is a permanent magnet. According to the invention, the magnet 9 is arranged in such a manner that the magnetic flux $\phi_M$ that is generated by it is directed into or out of the magnetizable section 60 of the bending element 10 in a symmetrical manner and vertically to its longitudinal axis A-A. The magnetization direction of the magnet 9 extends in the vertical direction corresponding to the axis B-B. The air gap between the bending element 10 and the one pole of the magnet 9 is so small that the bending element 10 can move in a collision-free manner.

The other pole of the magnet 9 is located in the middle of the yoke of the magnetically soft circuit 7', which is also referred to as a stator. Wound around the stator 7' is the electrical drive coil 5 and 6, which is divided into two symmetrical halves. The stator comprises two pole surfaces 21 and 22 that are arranged so as to be facing the pole surfaces of the anchor 28 and 29. According to the invention, the pole surfaces of the anchor are arranged in a plane. In addition, they are arranged on top of each other in a projection along an axis B-B. Hence, the pole surfaces of the stator 7' have to be tilted outward by the value of the maximal swivel angle of the anchor 60, so that a uniform, parallel minimal air gap between the pole surfaces 21 and 28, or 22 and 29 is created at maximal deflection.

The magnetic flux $\phi_{el}$ 37 that is generated in the drive coil 5 and 6 by the alternating current flows through the stator 7', the air gaps forming its pole surfaces 21 and 22 together with the anchor pole surfaces 28 and 29, and through the anchor 60. In this closed circuit the electrically excited flux 37 is added to or subtracted from the two circuits of the permanent-magnetically excited fluxes 30 and 31, so that forces of different strength are created at the air gap boundary surfaces. Then, the resulting force creates a torsional moment in the anchors 60 center of rotation, with its magnitude depending in a directly proportional manner on the magnitude of the resulting force, and its direction depending in a directly proportional manner on the polarity of the current flow 34 and 36.

The magnet 9 is surrounded by a short-circuited winding 8.1. This sleeve, which primarily consists of copper and has a wall thickness of at least 0.2 mm, but preferably of 1 to 2 mm, has an inner contour that is well adjusted to the cross-sectional dimensions of the magnet 9. The maximal length of the sleeve is the length of the magnet 9, but it can also be shorter, in which case it should always be located in the top part of the magnet close to the air gap.

The bending element 10 is preferably made of spring steel and forms a torsion spring together with the oscillating arms 18, 19, with its spring constant being determined by the length, width and thickness as well as the material of the oscillating arms 18, 19. Alternatively, it is also possible that the bending element 10 is made of a fiber composite material which either contains ferromagnetic material or onto which ferromagnetic material is applied in a force-fitting manner, for example by means of coating. Fiber composite material has less mass than spring steel, so that it is possible to manufacture bending elements that have very high natural torsional frequencies (e.g. >1 6 kHz) at a suitable spring constant.

The stator 7' preferably consists of a lamellated ferromagnetic material, for example made of multiple thin metal sheets with a thickness of approximately 0.05 mm to approximately 0.50 mm from FeSi, FeNi, FeCo or unalloyed or low-alloyed iron, with the sheets being isolated from one another.

The other components of the torsional resonance oscillator 100' can be made of non-ferromagnetic material, as long as they do not contribute to the conduction and support of the magnetic fluxes $\phi_1$, $\phi_2$, $\phi_M$. The base plate 1 and the end brackets 2 or the fixation plates 3, 4 can be made of any material which ensures a stable fixation of the bending element 10.

In the present exemplary embodiment according to FIGS. 5 and 6, the torsional resonance oscillator 100' is equipped with an optical sensor system 40, which is configured for the purpose of detecting the entire oscillation movement of the anchor 60. For this purpose, the sensor system in the present exemplary embodiment comprises a light-emitting element or a light-source 43 that emits a beam of light in the direction of a reflection surface 11 of the bending element 10, which is reflected at that location and then impinges at a clamping angle 41 on an optical detector 42, which is suitable for detecting the modulation of the beam of light proportionally to the rotational angle of the anchor 60. In particular, the present optical sensor system has the ability to detect the entire oscillation amplitude, the frequency as well as possible distortions of the oscillation, which may be caused by a defective bending element 10, for example.

The light-source 43 can be a coherent or a non-coherent light-source, such as an LED (light emitting diode) or a laser diode, for example. As the detector, a so-called "position sensitive device" (PSD), a so-called "charge coupled device" (CCD), an assembly of discrete photo diodes or the like can be used, for example.

Preferably, the reflection point is arranged in the centroid of the area of the anchor 60, so that the entire oscillation amplitude can be detected in an effective manner. In the exemplary embodiment that is shown here, it is not possible to arrange the sensor system 40 below the anchor 60 due to the lack of space, wherein an attachment of the sensor system 40 below the oscillating arms 18, 19 would not be sufficient anyway to detect the entire oscillation amplitude of the anchor 60. Therefore, the optical sensor system 40 is arranged above the anchor 60 in the present exemplary embodiment.

Further, a control device can be provided, which is not shown here and which is operatively connected to the optical sensor system 40 and/or to the drive coil 5, 6 and controls or regulates the oscillation amplitude and/or the oscillation frequency. Thanks to this regulation, it is also possible to selectively vary the dynamic range (zoom effect) without having to provide an elaborate optical system.

PARTS LIST 1 base plate
2 end bracket
3, 4 fixing screws
3a, 4a fixation plate
5 first drive coil
6 second drive coil
7 first stator core
7' stator
8 second stator core
8.1 short-circuited winding
9 magnet
10 bending element
11 central element
12, 13 end lug
14, 15 recesses
14', 15' support
16 screw
17 thread hole
18, 19 oscillation arms
20 pole shoe
21, 22 free ends of the pole shoe
23 first half of the pole shoe
24 second half of the pole shoe
25 pole tip
26, 27 outer rim of the bending element
28, 29 outer rim of the central element
30 first magnetic circuit
31 second magnetic circuit
34, 36 arrow
40 optical sensor system
41 clamping angle of the sensor system
42 detector
43 light source
50 reflux element
60 magnetizable partial area of the bending element
100 scanning device
100' torsional resonance oscillator
A-A longitudinal direction of the bending element
B-B symmetry axis of the pole shoe

The invention claimed is:

1. An optical resonance scanner, comprising:
a resilient bending element (10) excitable to rotationally vibrate about a longitudinal axis (A-A), by at least one stationary magnet (9) and at least one stationary drive coil (5), wherein the drive coil (5) is wound around a pole shoe (20) which is magnetically coupled to the magnet (9) and has two opposing free ends (21, 22) between which the bending element (10) is arranged symmetrically so that, between the bending element (10) and the free ends (21, 22) of the pole shoe (20), a magnetic flux is transmittable between the bending element (10) and the free ends (21, 22) of the pole shoe (20) in a manner substantially perpendicularly to the longitudinal axis (A-A), wherein the magnet (9) is arranged symmetrically relative to the free ends (21, 22) of the pole shoe (20) so that the magnetic flux generated by the magnet (9) couples to the bending element (10) substantially perpendicularly to the longitudinal axis (A-A), and a first magnetic circuit (30) is formed by the magnet (9) and a first half (23) of the pole shoe (20), and a second magnetic circuit (31) is formed by the magnet (9) and a second half (24) of the pole shoe (20), both by way of the superposition of the magnet-induced and coil-induced magnetic fluxes, said magnetic circuits extending counter to one another through a magnetizable portion (60) of the bending element (10) in a plane perpendicular to the longitudinal axis (A-A); and
a short circuit winding (8.1) surrounds the magnet (9).

2. The optical resonance scanner according to claim 1, further comprising a second drive coil (6), wherein the first drive coil (5) is wound around the first half (23) of the pole shoe (20) and the second drive coil (6) is wound around the second half (24) of the pole shoe (20).

3. The optical resonance scanner according to claim 1, wherein the pole shoe (20) comprises a first stator core (7) and a second stator core (8) that is separate from the first stator core (7), which form the first and the second half (23, 24) of the pole shoe (20), with each of the first and second stator cores configured so as to be substantially C-shaped.

4. The optical resonance scanner according to claim 1, wherein the magnet (9) and the pole shoe (20) or the magnet (9) and the two halves (23, 24) of the pole shoe (20) are magnetically coupled to each other via a reflux element (50).

5. The optical resonance scanner according to claim 1, wherein the bending element (10) is fixed in end brackets (2) at both its ends with respect to its longitudinal axis (A-A), and said end brackets (2) each comprise a non-magnetic material.

6. The optical resonance scanner according to claim 1, further comprising one base plate (1) of a preferably non-magnetic material, and end brackets (2), a reflux element (50), the pole shoe (20), the first stator core (7), a second stator core (8) and/or the magnet (9) are fixedly attached to the base plate (1).

7. The optical resonance scanner according to claim 1, wherein the bending element (10) has a substantially symmetrical embodiment with respect to its magnetizable portion (60) thereof for the purposes of generating substantially symmetric vibrations, and/or the center of gravity of the bending element (10) lies symmetrically in the region of the magnetizable portion (60) of the bending element (10).

8. The optical resonance scanner according to claim 1, wherein the magnetizable portion (60) forms a central section of the bending element from which two connecting arms (18, 19) extend diametrically and are connected with trapezoidal shaped end lugs (12, 13) inside end brackets (2).

9. The optical resonance scanner according to claim 8, wherein the central section (11) is substantially planar and disk-shaped, and/or projects beyond the connecting arms (18, 19) in the direction of the stator cores (7, 8) obliquely to the longitudinal direction (A-A) of the bending element (10).

10. The optical resonance scanner according to claim 8, wherein the bending element (10) at least partially comprises a ferromagnetic material or of a fiber composite material or a combination of these materials.

11. The optical resonance scanner according to claim 8, wherein the bending element (10) comprises at least one light-reflecting and/or light-emitting and/or light-detecting element in the portion (60) or on the central section (11), in particular on a side that is facing away from the magnet (9).

12. The optical resonance scanner according to claim 8, wherein an air gap in the range of 0.2 mm to 1.5 mm is established between the magnetizable section (22) or central section (11) and the magnet (9) as well as the free ends (21, 22) of the pole shoe (20), so that the central section (11) can oscillate without collision between the magnet (9) and the free ends of the stators (21, 22) and so that the central section (11) is penetrated to a maximum extent by the magnet-induced and coil-induced magnetic fluxes.

13. The optical resonance scanner according to claim 1, further comprising an optical sensor system (40) with a light source (43), and an intensity-sensitive and/or position-sensitive detector (42) on the side of the bending element (10) facing away from the magnet (9) to register the whole vibration amplitude and/or the vibration frequency of the bending element (9) as it oscillates.

14. The optical resonance scanner according to claim 13, further comprising a control device operatively connected to the optical sensor system (40) and/or the first and/or a second drive coil (5; 6), to control or regulate the entire oscillation amplitude and/or the oscillation frequency of the oscillating bending element (10).

15. The optical resonance scanner according to claim 1, wherein free ends of the pole shoes (21, 22) are aligned with respect to the magnetizable portion (60) in such a manner that a parallel minimal air gap is created during maximal deflection of the magnetizable portion (60), and wherein an end face of the magnet (9) that is facing towards the magnetizable portion (60) is aligned in parallel to the magnetizable section (60) in the inactive state, and further wherein the free ends of the pole shoes (21, 22) and the end face of the magnet (9) that is facing towards the magnetizable portion (60) and the magnetizable portion (60) are arranged on top of each other in a projection along the symmetry axis of the pole shoe (B-B).

* * * * *